Feb. 5, 1963   H. C. HEUSER   3,076,355
TOOL HOLDER
Filed Nov. 3, 1958
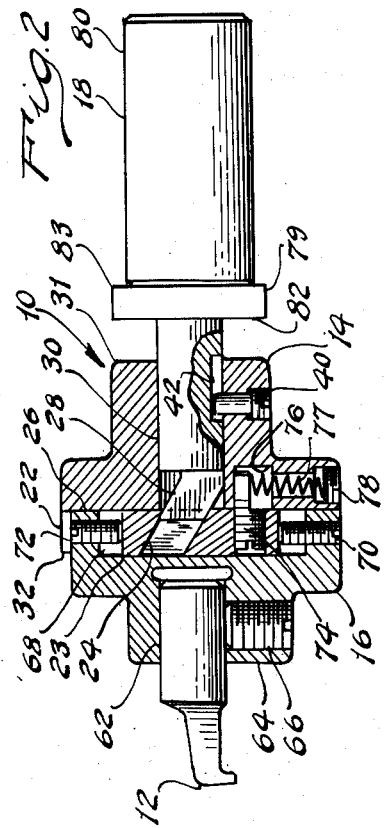
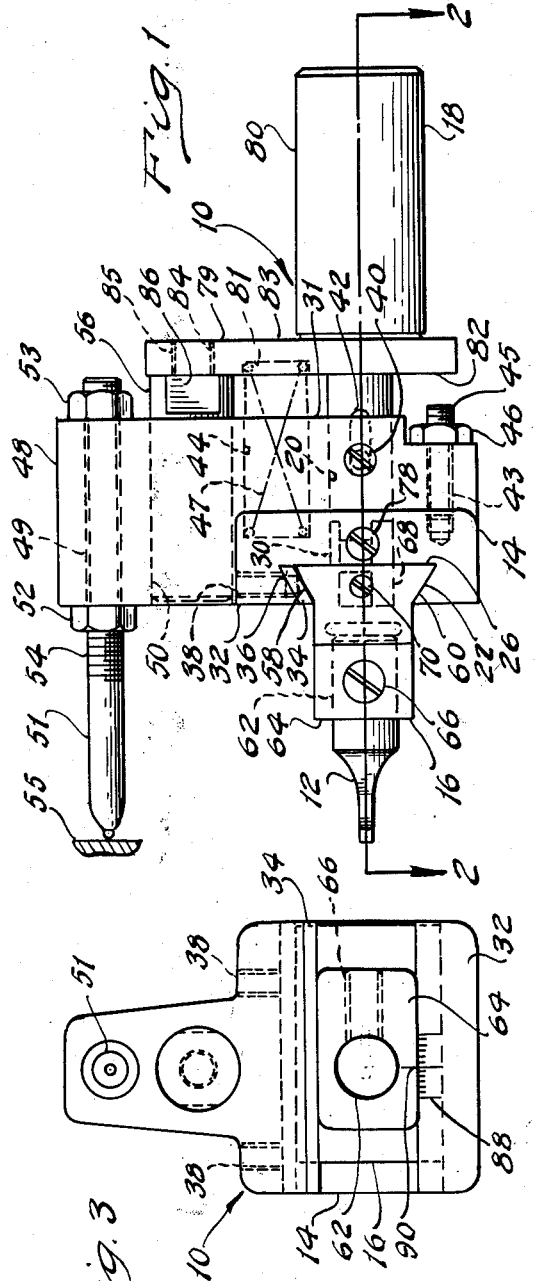
INVENTOR.
HELMUT C. HEUSER
BY Whittemore
Hulbert & Belknap
ATTORNEYS.

United States Patent Office 3,076,355
Patented Feb. 5, 1963

3,076,355
TOOL HOLDER
Helmut C. Heuser, Birmingham, Mich., assignor to Bokum Tool Company, Inc., Detroit, Mich., a corporation of Michigan
Filed Nov. 3, 1958, Ser. No. 771,508
10 Claims. (Cl. 77—58)

This invention relates to tool holders and refers more particularly to a recess tool holder including means to adjust the tool in a direction transverse to the longitudinal axis of the tool holder.

In the manufacture of machined articles it is often desired to provide grooves or recesses in interior surfaces such as those found in bores. These interior surfaces may be of different diameter or it may be desired to provide a different depth of cut in the same surfaces. In the past such operations have required separate tools for the individual diameters and cuts.

It is one of the objects of the present invention therefore to provide a tool holder so constructed that a single tool mounted thereon may be used to produce an interior recess of selected depth in members with different bore diameters.

It is a further object to provide a tool holder having a tool carrying slide thereon with means to laterally move the slide with respect to the tool holder.

It is a further object to provide a tool holder adapted to be carried by a chuck and be advanced toward a rotating work piece thereby with means to laterally move the tool attached to the tool holder into engagement with the work piece when said tool holder is advanced into a predetermined relationship with the work piece.

Another object is to provide a tool holder having resilient means included therein biasing the tool in a direction to disengage the tool from the work piece.

Still another object is to provide a tool holder having a tool carried in a slide thereon with an inclined keyway and an inclined key engageable to move said slide and tool in a lateral direction with respect to the axis of the tool holder.

Still another object is to provide a tool holder which is simple in construction, easy to produce and efficient in use.

Other objects and features of the invention will become apparent as the description proceeds, especially when taken in conjunction with the accompanying drawings, illustrating a preferred embodiment of the invention, wherein:

FIGURE 1 is a side elevation of a tool holder constructed according to the invention.

FIGURE 2 is a sectional view of the tool holder of FIGURE 1 taken along line 2—2.

FIGURE 3 is a view of the left end of the tool holder of FIGURE 1 with the cutting tool removed.

The embodiment of the present invention illustrated in the figures is a tool holder generally designated 10 adapted to carry a cutting tool 12 and to move the tool laterally with respect to the longitudinal axis of the tool holder after the tool is in proper relation with a work piece. The tool holder includes a body member 14, a slide 16 and a pilot bar 18. The body member 14 is provided with a bore 20 and a dovetail slot 22 laterally extending across one end of bore 20. Slide 16 is positioned within slot 22 and has a slide block 23 with an inclined keyway 24 therein recessed into the surface 26 thereof adjacent bore 20. Pilot bar 18 is inserted in bore 20 and includes inclined key 28 on end 30. In operation, with body member 14 held against axial movement, pilot bar 18 is moved axially within bore 20 engaging inclined keyway 24 with key 28 thereby causing slide 16 carrying tool 12 to move laterally with respect to tool holder 10.

Body member 14 may be a metal casting of the form indicated in the figures. Body 14 is provided as shown with a bore 20 between surfaces 31 and 32 thereof to receive end 30 of pilot bar 18. A dovetail slot 22 to receive slide 16 is machined in surface 32 extending laterally across bore 20. A spacer 34 is provided against one wall 36 of dovetail slot 22 which acts in conjunction with set screws 38 extending through wall 36 to slidably retain slide 16 in slot 22. A removable pin 40 extends through the wall of bore 20 as best shown in FIGURE 2 and engages recess 42 in pilot bar 18 to prevent bar 18 and body 14 from becoming separated.

Recesses 43 and 44 are also provided in body member 14 extending from surface 31 toward surface 32 parallel to bore 20. Recess 43 is tapped to receive adjustable stop 45 and its associated nut 46. Stop 45 serves to limit the axial travel of pilot bar 18 in bore 20 thereby limiting the radial adjustment of slide 16 and tool 12. Recess 44 is provided to retain spring 47 acting between pilot bar 18 and body member 14 to bias body member 14 and pilot bar 18 in a disengaging direction. Spring 47 therefore also biases tool 12 out of engagement with a work piece.

Body 14 is further provided with an extension 48 having bores 49 and 50 extending therethrough parallel to bore 20 as illustrated in FIGURE 1. Bore 49 is adapted to receive shaft 51. Shaft 51 is attached to body 14 by threaded nuts 52 and 53 engaging threads 54 on the shaft. In operation shaft 51 is set to engage a non-yielding surface 55 on the machine carrying the tool holder 10 during axial travel of tool holder 10 thereby halting the axial travel of the body 14 and slide 16. Further axial travel of pilot bar 18 then causes the desired lateral adjustment of slide 16 and associated tool 12 due to interaction between keyway 24 and key 28. Bore 50 is provided to allow the insertion of guide pin 56 carried on pilot bar 18 into body member 14. Pin 56 helps maintain body member 14 and shaft 51 parallel.

Slide 16 may also be a metal casting with form as shown in the figures. The surfaces 26, 58 and 60 of slide 16 are machined in the form indicated best in FIGURE 1 to fit within slot 22. A bore 62 is provided in surface 64 of slide 16 to receive tool 12. Tool 12 is securely fastened in bore 62 by means of set screw 66.

A recess 68 is provided in the surface 26 of slide 16 to receive slide block 23. Slide block 23 is adjustably secured within recess 68 as shown best in FIGURE 2 by means of set screws 70 and 72. Adjustment of tool 12 radially with respect to bore 20 may be accomplished with set screws 70 and 72.

Slide block 23 is provided with keyway 24 inclined at an angle to the longitudinal axis of slot 22 whereby slide 16 may be moved lengthwise of slot 22 by insertion of inclined key 28 in keyway 24.

A metal stud 74 shaped as shown in FIGURE 2 is secured within slide block 23 and protrudes therefrom into a recess 76 in the bottom of slot 22 as shown. Stud 74 acts in conjunction with spring 77 and flat point set screw 78 to bias slide 16 against movement lengthwise of slot 22 on insertion of key 28 in keyway 24.

Pilot bar 18 as shown best in FIGURE 2 includes a cylindrical shaft having a flat radial extension 79 between ends 30 and 80. End 30 is of a diameter to fit slidably within bore 20. An inclined key 28 is provided on end 30 as shown in FIGURE 2 and is adapted to be inserted in keyway 24 in slide block 23 when end 30 is moved axially with respect to bore 20 whereby movement of slide 16 laterally of bore 20 is produced. End 80 is adapted to be held in a spindle or chuck (not shown) which may impart both rotary and axial movement to tool holder 10.

Extension 79 as indicated contains recess 81 in surface 82 positioned to be in alignment with recess 44 in body member 14. Bore 85 is also provided through extension 79 between surfaces 82 and 83 thereof in alignment with bore 50 in body member 14. One end of spring 47 is inserted in recess 81 and is held in position thereby as shown. Guide pin 56 is secured in bore 85 by means of threads 84 as shown. Flat surfaces 86 are provided on guide pin 56 to facilitate the attachment of pin 56 in bore 85. Guide pin 56 as previously mentioned serves to prevent bending of extension 48 of body member 14 in operation and thereby assures alignment of shaft 51 and body member 14 so that correct depth adjustment of tool 12 is maintained.

The tool holder 10 described above may be used to recess the interior of radial members such as pipe. A tool 12 is placed in tool holder 10. End 80 of pilot bar 18 is inserted in a chuck for axial movement therewith. The member to be recessed is placed in a complementary rotating chuck. Tool holder 10 is then advanced by means of axial movement of the chuck holding the pilot bar 18 until tool 12 is inserted to a predetermined depth within the rotating member to be recessed. This depth is determined by the setting of shaft 51 on body member 14. When shaft 51 engages surface 55 axial movement of body member 14 and slide 16 is arrested. Further advancement of the chuck holding the pilot bar 18 will cause end 30 of bar 18 to move axially within bore 20 and guide pin 56 to move axially within bore 50 in opposition to spring 47 whereby key 28 engages keyway 24 causing slide 16 to move radially with respect to bore 20 in opposition to spring 78. Radial movement of slide 16 causes tool 12 to contact the member to be recessed as desired.

Tool 12 may be radially adjusted for the particular diameter of the work piece by proper setting of slide block 23 with set screws 70 and 72 before beginning the recessing operation. Adjustment of recess depth may be made during the operation by controlling the axial movement of pilot bar 18 within bore 20. A limit to such axial movement may be provided with stop 45 on body member 14. Scale 88 is provided on body member 14 as shown in FIGURE 3 which in conjunction with index 90 on slide 16 will indicate the magnitude of the recess depth adjustment.

The drawings and the foregoing specification constitute a description of the improved tool holder in such full, clear, concise and exact terms as to enable any person skilled in the art to practice the invention, the scope of which is indicated by the appended claims.

What I claim as my invention is:

1. A tool holder comprising a body member having a first bore therein, a pilot bar inserted within said first bore, a slide mounted on said body member, means producing lateral movement of the slide with respect to said first bore on axial movement of the pilot bar within said first bore, a second bore in said body member parallel to said first bore and a guide pin attached to said pilot bar slidably inserted in said second bore to prevent bending of said body member.

2. Structure as claimed in claim 1 including resilient means between said body member and said pilot bar biasing said pilot bar in a direction to withdraw it from said bore.

3. Structure as claimed in claim 1 including resilient means acting between the slide and body member to bias said slide with respect to the body member in a direction to oppose the said lateral movement of the slide on insertion of the pilot bar in the bore.

4. Structure as claimed in claim 1 including adjustable stop means mounted on said body member to limit the axial insertion of the pilot bar in said bore.

5. The structure as claimed in claim 1 wherein said slide has a recessed surface adjacent one end of said first bore and including a slide block having an inclined keyway therein secured within said recessed surface.

6. The structure as claimed in claim 5 wherein said slide block is adjustably secured within said recessed surface.

7. A tool holder comprising a body member having a first bore therein, a pilot bar inserted within said first bore, a slide mounted on said body member, means producing lateral movement of the slide with respect to said first bore on axial movement of the pilot bar within said first bore, a second bore in said body member parallel to said first bore, a guide pin attached to said pilot bar slidably inserted in said second bore to prevent bending of said body member, a recess in said body member between said first and second bores, and resilient means within said recess acting between said pilot bar and body member to bias said pilot bar out of said first bore.

8. A tool holder comprising a body member having a first bore therein, a pilot bar inserted within said first bore, a slide mounted on said body member, means producing lateral movement of the slide with respect to said first bore on axial movement of the pilot bar within said first bore, a second bore in said body member parallel to said first bore, a guide pin attached to said pilot bar slidably inserted in said second bore to prevent bending of said body member, a recess in said body member between said first and second bores, resilient means within said recess acting between said pilot bar and body member to bias said pilot bar out of said first bore, and adjustable stop means mounted on said body member adjacent said second bore and opposite said recess and first bore to limit the movement of said body member toward a workpiece.

9. A tool holder comprising a body member having a bore therethrough and a dovetail slot in one end thereof extending laterally across one end of the bore, slide means adapted to hold a cutting tool positioned within said slot, said slide means having a keyway extending axially of said tool holder and inclined in the direction of extension of said slot recessed in a surface thereof adjacent said bore, a pilot bar inserted in the other end of said bore having an axially extending key on the end inclined in the same direction as said keyway and engageable with said keyway to cause said slide to move laterally with respect to the bore axis with axial movement of the pilot bar within the bore, a second bore in said body member parallel to the first mentioned bore and a guide pin attached to said pilot bar slidably inserted in said second bore to prevent bending of said body member.

10. A tool holder comprising a body member having a first bore therein, a pilot bar inserted within said first bore, a tool carrying member mounted on said body member, means producing movement of the tool carrying member with respect to said body member on axial movement of the pilot bar within said first bore to advance a tool carried thereby toward a workpiece, a second bore in said body member parallel to said first bore and a guide pin attached to said pilot bar slidably inserted in said second bore to prevent bending of said body member on relative movement axially of said bore of said body member and pilot bar.

References Cited in the file of this patent

UNITED STATES PATENTS

| 2,247,283 | Young | June 24, 1941 |
| 2,497,426 | Toth | Feb. 14, 1950 |
| 2,745,668 | Haas | May 15, 1956 |
| 2,874,597 | Bach | Feb. 24, 1959 |

FOREIGN PATENTS

| 1,038,110 | France | May 6, 1953 |